Patented July 1, 1924.

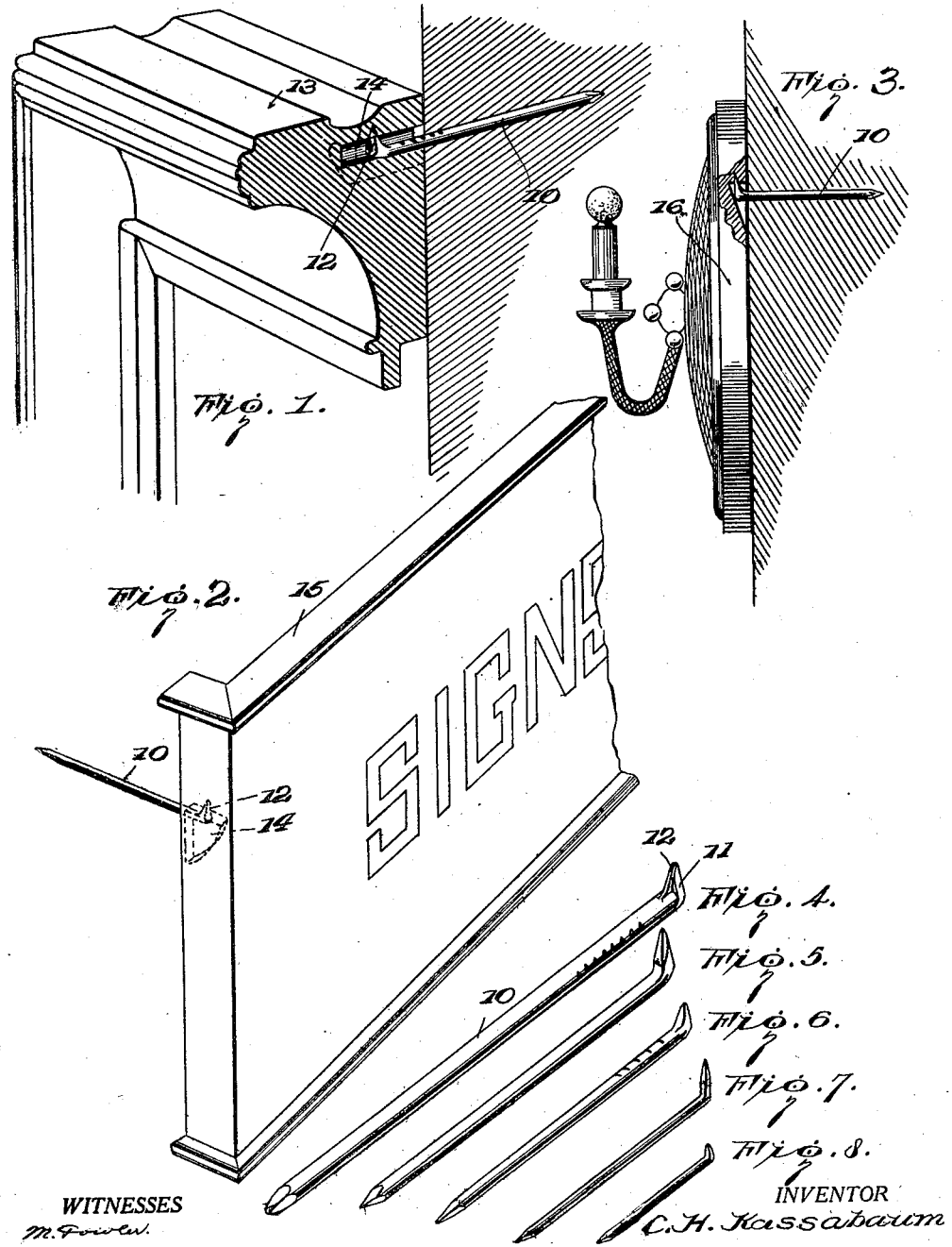

1,499,826

UNITED STATES PATENT OFFICE.

CHARLES HENRY KASSABAUM, OF ATCHISON, KANSAS.

NAIL.

Application filed November 3, 1923. Serial No. 672,604.

*To all whom it may concern:*

Be it known that I, CHARLES H. KASSABAUM, a citizen of the United States, and a resident of Atchison, in the county of Atchison and State of Kansas, have invented certain new and useful Improvements in Nails, of which the following is a specification.

My present invention relates generally to nails, and more particularly to a nail adapted to form a concealed fastener for pictures, signs, wall decorations, window frames, interior trim and the like, my object being the provision of a simple inexpensive fastening of this character which will be entirely concealed from view in the effective position, which is extremely cheap and effective and which is at the same time lasting and durable.

In the accompanying drawing which illustrates my present invention and forms a part of this specification, Figures 1 and 2 are perspective views illustrating the practical application of my invention for the support of interior trim and signs, Figure 3 is a sectional side view illustrating use of the invention in connection with wall ornaments or brackets, and Figures 4 to 8 inclusive are perspective views showing slightly modified forms of my invention in various sizes.

Referring now to these figures my invention proposes a nail having a body 10 of the usual wire or other construction and which is capable of being manufactured in the usual manner, the body 10 having a head 11 at one end which like the ordinary nail head is useful in driving the nail into place and which unlike the ordinary round head, is in the form of a sharpened tang 12 extending angularly with respect to the body and terminating in a sharpened apice or extremity capable of ready penetration when the nail is driven suitably into any supporting surface with the head thereof projecting sufficiently beyond said supporting surface to be received within a recess or other cavity in the support engaging surface of an article which it is desired to secure against the support.

Thus my improved nail may be conveniently utilized in connection with interior house trim, for instance molding or door or window frames such as indicated at 13 in Figure 1, having for the purpose of my invention a bore 14 formed at its inner surface to receive the head of the nail with its angular tang 12 turned vertically so that its sharpened apice or extremity may readily enter and securely engage the molding when the latter is pulled downwardly to a slight extent. This is equally true in connection with signs and the like 15 as illustrated in Figure 2 and wall decorations or brackets as illustrated at 16 in Figure 3 and it is thus obvious my invention provides in a simple inexpensive manner for an effective efficient concealed fastening whose use is obvious and whose manner of application is apparent from a brief inspection thereof.

I claim:

In combination with an article to be mounted having a recess, of a nail adapted to form a concealed fastening for such article, said nail having a head at one end in the form of an angularly projecting and relatively short tapering tang adapted to extend into the recess of the said article to be mounted and terminating in a sharpened extremity adapted to penetrate the wall of said recess as and for the purpose set forth.

CHARLES HENRY KASSABAUM.